Patented Sept. 12, 1944

2,358,140

UNITED STATES PATENT OFFICE 2,358,140

WATERPROOFING MATERIAL AND METHOD OF MAKING THE SAME

Lloyd F. Bramble, Chicago, Ill., assignor to Trumbull Asphalt Company, Chicago, Ill., a corporation of Illinois No Drawing. Application May 22, 1939, Serial No. 275,105

2 Claims. (Cl. 117—168)

This invention relates to improvements in waterproofing material and method of making the same, and more especially to a coating for waterproofing porous material, such as insulating boards, papers, fabrics, and the like, by surface application or impregnation or both.

Among the features of my invention is the making of a waterproofing material from petroleum products which is highly moisture resistant and adhesive. My improved material, after application soon hardens sufficiently so that it is no longer sticky or tacky. Coated material, therefore, can be stacked, rolled, or piled without the use of any anti-stick medium.

It has long been customary to use asphalt for waterproofing felts, insulating boards, papers, and the like, by applying a surface application or by impregnation, either totally or in part, as by means of dipping, coating, and the like. However, due to the characteristic sticky or tacky surface nature of asphalt, other surface material such as finely divided clays, micas, and the like, or paint or other organic or inorganic substances have heretofore been used on the coated surfaces to prevent surface sticking or cohesion when the treated material was shipped, packed, or otherwise handled. In the practice of my invention, my new waterproofing material, shortly after application, is sufficiently non-sticky or non-tacky so that the treated material can readily be stacked, shipped, or otherwise handled.

It has also been known that waxes or other ingredients may be incorporated with asphalts to induce or promote a surface which does not require any superficial application for prevention of adhesion or sticking of surfaces. My invention is entirely novel and unique, however, in the fact that only asphalts or asphaltic materials are used. This reduces the cost of manufacture. Products treated with my improved material may be stacked, rolled, or piled together without substantial evidence of undesirable sticking.

In the practice of my invention I mix pressure tar, for example, such as used for a binder in the making of briquettes, with a vacuum reduced residual flux or a steam reduced asphalt or flux oil. The tar and asphalt or flux are mixed substantially in the proportions of half and half by weight, although variations are permitted by which the proportions may be varied from half and half to 30%–70% each way.

The pressure tar used must have the following characteristics:

Melting point (ball and ring method) °F__ 100–200
Penetration at 77° F_____ 2– 75
Viscosity (Saybolt Furol) at 325°
F. _____seconds__ 10–250

Preferably the pressure tar has the following characteristics:

Melting point (ball and ring method) °F__ 110–150
Penetration at 77° F_____ 10– 30
Viscosity (Saybolt Furol) at 325°
F. _____seconds__ 20– 75

The vacuum reduced or steam refined residual flux or asphalt must have the following characteristics:

Melting point (ball and ring method) °F__ 40– 200
Penetration at 77° F_____ 10– 350
Viscosity (Saybolt Furol) at 212°
F. _____seconds__ 50–5000

Preferably the vacuum reduced residual flux has the following characteristics:

Melting point (ball and ring method) °F__ 80–110
Penetration at 77° F_____ 80–120
Viscosity (Saybolt Furol) at 212°
F. _____seconds__ 200–500

The tar and residual flux or asphalt are melted and thoroughly mixed. The liquid mixture is then processed or hardened by blowing air therethrough, such process being well known in the art of treating asphalts, tars, and the like, and commonly referred to as oxidation or polymerization or condensation.

The completed product has a melting point from 200° to 300° F. (ball and ring method); penetration at 77° F. from 0 to 10; and viscosity (Saybolt Furol) at 425° F. from 75 to 300 seconds. The viscosity preferably will lie between 100 and 200 seconds.

Another important feature of the invention is the improved packaging of material impregnated with my new waterproofing composition. Heretofore in packaging coated or impregnated sheet material or fabric layers in juxtaposition, undesirable sticking frequently occurred unless the layers were coated with some other material to prevent such sticking. In the practice of my invention, for example, a strip of roofing paper may be impregnated with my improved material and then formed into a roll and thus packaged without any undue sticking of adjacent layers; so that when ready for use the material can be easily unwound without any damage or tearing. Likewise, sheets of wall board, papers, fabrics, insulating boards and other sheet material may be coated or partially or completely impregnated and a plurality of the same packaged with adjacent sheets in contact, without any undue sticking.

I claim:

1. A package containing rigid sheet material with layers in contact, said layers being impregnated with asphalt waterproofing composition, said composition on each layer being cohesive to itself and adhesive to the sheet material, but the composition on one layer being non-adhesive to the composition on the contacting layer, said composition being an air-blown material, having a melting point from 200° to 300° F., penetration at 77° F. from 0 to 10, and viscosity at 425° F. from 75 to 300 seconds.

2. A composition of matter comprising rigid sheet material, a surface of which is coated with a mixture of pressure tar having a melting point (ball and ring method) from 100° to 200° F., penetration at 77° F. from 2 to 50, viscosity (Saybolt Furol) at 325° F. from 10 to 250 seconds; and partial pressure reduced residual flux having a melting point (ball and ring method) from 40 to 200° F., penetration at 77° F. from 10 to 350, viscosity (Saybolt Furol) at 212° F. from 50 to 5000 seconds; said mixture having been polymerized until it has a melting point (ball and ring method) from 200° to 300° F., penetration at 77° F. from 0 to 10, and viscosity (Saybolt Furol) at 425° F. from 75 to 300 seconds.

LLOYD F. BRAMBLE.